Oct. 8, 1929.　　　I. D. FORD　　　1,730,607

SECURING MEANS

Filed May 26, 1928

INVENTOR
Ira D. Ford
BY
Emery, Booth, Janney & Varney
ATTORNEYS

Patented Oct. 8, 1929

1,730,607

UNITED STATES PATENT OFFICE

IRA D. FORD, OF ROSELAND, ONTARIO, CANADA, ASSIGNOR TO UNIVERSAL BUTTON FASTENING & BUTTON COMPANY, OF DETROIT, MICHIGAN, A CORPORATION OF MICHIGAN

SECURING MEANS

Application filed May 26, 1928. Serial No. 280,635.

This invention relates to snap fastener securing means and aims to provide improved means for utilizing snap fasteners for detachably securing pieces of cloth together.

Figure 1:
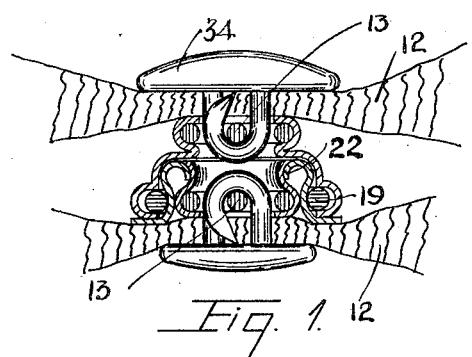
Figure 2:
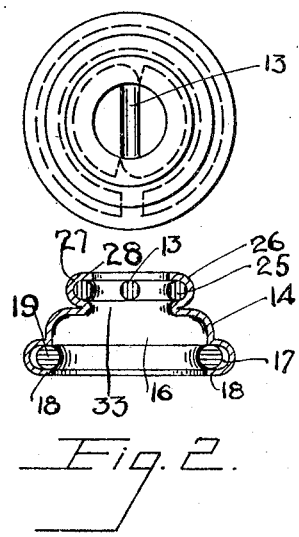
Figure 3:
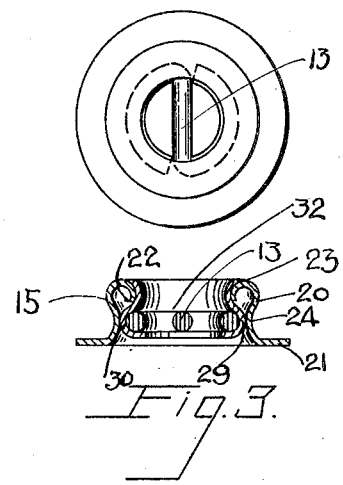
Figure 4:
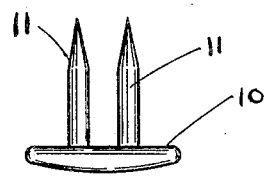

The invention may be readily understood by reference to one illustrative embodiment thereof shown in the accompanying drawing, in which:

Fig. 1 is a section through the elements of a closed snap fastener shown as holding together overlapping pieces of fabric;

Fig. 2 comprises a section through the socket part of a snap fastener together with a plan view thereof;

Fig. 3 is a corresponding section and plan view of the stud part of the fastener; and Fig. 4 is an elevation of a double pronged fastener used to attach the parts of the snap fastener.

Because of the facility of their application and because they require no button holes, snap fasteners are advantageous for fastening together overlapping pieces of cloth or the like, particularly in working clothing and other articles where ease in fastening or unfastening is important or where fastening by buttons or hooks is difficult or unsuitable. However, the strain which is placed on the cloth to separate snap fastener parts having adequate separation resistance for articles of clothing of this character, frequently results in tearing of the cloth at the point of attachment of the fastener, due to weaknesses created by severing of the threads of the cloth by the attaching means and to inadequate gripping of the cloth by the attaching elements. Snap fasteners have, therefore, been objectionable notwithstanding their inherent advantages, except for unusually strong materials such as leather.

The improved attaching means is herein represented by a headed, double-prong tack or fastener 10 whose prongs 11 are sharply pointed and pierce the cloth 12 (without weakening it) at points sufficiently separated to embrace therebetween a substantial portion of the gripped area of cloth. After penetrating the cloth the fastener prongs attach a snap fastener part by passing around a separately formed transverse bar 13 secured in the base of the snap fastener part.

The snap fastener is represented herein by a socket part 14 and a stud part 15 which is received and separably held within the socket. The socket part 14 is advantageously pressed from sheet metal and provided with a cup shaped recess or socket 16 having an interior groove 17 adjacent the edge 18 of the rim of the socket. Loosely held within the groove is a spring 19 which in this instance extends almost but not quite around the circumference of the groove. The stud part comprises in this instance, a circular flange or stud 20 projecting from a base 21 which is preferably integral with the flange. The free edge 22 of the stud 20 is curled inwardly to provide a rounded stud extremity 23 whose external diameter is slightly greater than the normal or unstrained internal diameter of the spring 19. The depth of the projecting stud 20 is such that it may enter substantially into the socket recess 16, during which movement the spring ring 19 is expanded to pass over the bead 23 after which it contracts around the neck 24 or portion of the flange under the terminal bead 23. The internal diameter of the groove 17 is made sufficiently larger than the normal diameter of the ring to allow room for expansion of the ring in passing over the bead 23.

The spring strength of the spring ring 19 and shape and diameter of the bead 23 and neck 24 are designed to cause the snap fastener parts to offer appropriate resistance to separation. Where the fastener is designed for holding together portions of a cloth garment, for example, the resistance to separation of the stud and socket must be at least great enough to withstand the tension (which is sometimes relatively large) exerted in the normal use of the garment.

The bar 13 is herein provided in the form of a ring 25 formed from a single piece of wire bent into a closed S-shape wherein the middle portion provides the central transverse bar 13. In the present case the bar member is secured to the socket part of the fastener by being seated in a groove 26 formed in the base 27 of the socket and secured therein by upsetting or bending inwardly the free flange 28 of the socket base. The bar member is secured to the stud part of the snap fastener by means of a ring or eyelet 29 provided with a groove 30 in which the bar member is seated. The free flange 31 of the eyelet passes through the interior of the stud 20 and is expanded outwardly over the interior surface of the bead 23, thereby securing the eyelet firmly to the stud part 15.

The stud and socket parts are designed so that the central portions 32 and 33 thereof are accessible to a die which may be employed to upset or curl the fastener prongs about the bar from opposite sides and to exert sufficient pressure to clamp the fabric tightly between the head of the pronged fastener and the snap fastener base. The gripping of the cloth is indicated in Fig. 1 by a somewhat exaggerated reduction in thickness of the cloth. The bar member is made of wire of sufficient diameter and strength to withstand the bending action of the fastener prongs and to transmit the forces exerted thereon to the periphery of the bar ring and thence to the base of the fastener. It is possible by means of this construction to maintain a substantial compressive action on the cloth so that the grip thereon is a substantial factor in the firmness with which the snap fastener part is attached thereto. Moreover, since the fastener prongs penetrate the fabric without severing any portion thereof, there is little tendency for the fabric to slip between the gripping surfaces. There is, therefore, little likelihood that a slit in the fabric can be developed; and any tension which may reach the prongs is in this instance distributed between two prongs.

The improved fastener makes available the use of the snap fastener principle in clothing—particularly children's rompers and working-men's clothing such as overalls and coats. I have found that through the elimination of expensive button holes four handlings of certain types of garments may be eliminated in the fabrication of such garments. This is a very important item in the cost of manufacture because clothing is of a character which makes it particularly difficult and expensive to handle in passing it through the various manufacturing operations.

In addition to the direct benefits to the manufacturer of clothing, the advantages in use of the improved snap fastener are substantial. I have discovered that the combined securing action of the spaced piercing prongs and the clamping action above referred to provide a very great factor of safety in firmness and durability of attachment, particularly as compared with the force necessary to separate the fastener parts. The firmness and security of fastening enables one to derive the full benefit of the fastening characteristics of the snap fastener. They may not only be quickly and easily snapped together (by one hand if necessary) but by a single pull at an appropriate portion of the garment an entire line of fasteners may be separated, with the assurance that the cloth will not be weakened or torn and that the fasteners will remain securely attached during the useful life of the garment.

For purposes of decoration and advertisement the outer or top fastener may advantageously be provided with a head 34 larger than that necessary merely for attaching purposes.

Obviously the invention is not limited to the details of the illustrative construction, since these may be variously modified. Moreover, it is not indispensable that all features of the invention be used conjointly since various features may be used in different combinations and sub-combinations.

Having described one embodiment of my invention, I claim:

1. Cloth fabric securing means comprising in combination, a pair of inter-fitting snap fastener parts having cloth engaging bases with a central opening therein, a separately formed wire ring having a centrally located transverse bar secured in the openings of the respective fastener parts, headed double pronged fasteners whose prongs pierce the fabric without impairing its strength and are closely bent around the bars of the respective fastener parts to clamp the same tightly against the fabric, said fastener parts being constructed and arranged to be open on the interior, whereby the fastener prongs may be directly engaged by a tool for bending them about the respective bars.

2. Cloth fabric securing means comprising in combination, a pair of inter-fitting snap fasteners each provided with a fabric-engaging base having a separately formed wire bar extending across an opening therein, and headed double pronged attaching elements for attaching each of said fasteners to the fabric, the prongs thereof piercing the fabric without impairing its strength and being bent closely around the bars of the respective fastener parts from opposite sides, thereby clamping said parts tightly to the fabric, said fastener parts each being open on the interior whereby the fastener prongs may be engaged by a tool for bending them closely around the respective bars.

3. Cloth fabric securing means comprising in combination, a pair of inter-fitting snap fastener parts having cloth engaging bases with a central opening therein, said fastener parts being provided with internal grooves adjacent their cloth engaging faces, a separately formed wire ring having a centrally located transverse bar seated in each of said grooves, headed double pronged fasteners whose prongs pierce the fabric without impairing its strength and are closely bent around the bars of the respective fastener parts to clamp the same tightly against the fabric, said fastener parts being constructed and arranged to be open on the interior, whereby the fastener prongs may be directly engaged by a tool for bending them about the respective bars.

4. In combination, snap fastener elements having interfitting parts, one of said parts having a cloth engaging base portion formed with an opening therein, a member seated upon said base portion and having a portion extending across said opening, and means for securing said base portion to the cloth including a fastener having a prong adapted to extend through the cloth and opening aforesaid and have the end portion thereof return-bent around the portion aforesaid of the member.

5. In combination, snap fastener elements having interfitting parts, one of said parts having a cloth engaging base portion provided with an opening therein and having an annular groove adjacent said opening, a member seated within said groove and having a portion extending across said opening and means for securing said base portion to the cloth including a fastener having a prong adapted to extend through the cloth and through the opening aforesaid and have the end thereof return-bent around the portion aforesaid of said member.

In testimony whereof, I have signed my name to this specification.

IRA D. FORD.